US012760211B2

(12) United States Patent
Johannsen et al.

(10) Patent No.: US 12,760,211 B2
(45) **Date of Patent: *Oct. 13, 2026**

(54) AQUEOUS ADHESIVE COMPOSITION FOR LIGNOCELLULOSIC MATERIALS SUCH AS WOOD AND A METHOD OF PRODUCTION

(71) Applicant: ROCKWOOL INTERNATIONAL A/S, Hedehusene (DK)

(72) Inventors: Ib Johannsen, Aarhus (DK); Bjørn Sjøgren Kilsgaard, Aarhus C (DK); Miroslav Nikolic, Aarhus C (DK)

(73) Assignee: ROCKWOOL A/S, Hedehusene (DK)

( * ) Notice: Subject to any disclaimer, the term of this patent is extended or adjusted under 35 U.S.C. 154(b) by 1409 days.

This patent is subject to a terminal disclaimer.

(21) Appl. No.: 17/282,126

(22) PCT Filed: Sep. 26, 2019

(86) PCT No.: PCT/EP2019/076123

§ 371 (c)(1),
(2) Date: Apr. 1, 2021

(87) PCT Pub. No.: WO2020/069984

PCT Pub. Date: Apr. 9, 2020

(65) Prior Publication Data

US 2021/0371718 A1 Dec. 2, 2021

(30) Foreign Application Priority Data

Oct. 5, 2018 (EP) .................................... 18198995

(51) Int. Cl.

| | |
|---|---|
| ***C09J 197/00*** | (2006.01) |
| ***C08H 7/00*** | (2011.01) |
| ***C08L 97/00*** | (2006.01) |
| ***C09D 5/00*** | (2006.01) |

(52) U.S. Cl.

CPC ............ *C09J 197/005* (2013.01); *C08H 6/00* (2013.01); *C08L 97/007* (2013.01); *C09D 5/00* (2013.01)

(58) Field of Classification Search

CPC .......... C09D 5/00; C09J 197/005; C08H 6/00; C08L 97/007; C08L 29/04; C08L 71/02

See application file for complete search history.

(56) References Cited

U.S. PATENT DOCUMENTS

| | | | |
|---|---|---|---|
| 3,093,604 | A | 6/1963 | Ayers |
| 3,227,667 | A | 1/1966 | Moffitt et al. |
| 3,285,801 | A | 11/1966 | Sarjeant |
| 5,318,990 | A | 6/1994 | Strauss |
| 6,238,475 | B1 | 5/2001 | Gargulak et al. |

(Continued)

FOREIGN PATENT DOCUMENTS

| | | | |
|---|---|---|---|
| CN | 107286873 | A | 10/2017 |
| CN | 107459385 | A | 12/2017 |

(Continued)

OTHER PUBLICATIONS

Yan et al. Iron catalysed direct alkylation of amines with alcohols, Nature Communications vol. 5, Article No. 5602 (2014).*

(Continued)

*Primary Examiner* — Jun Li

(74) *Attorney, Agent, or Firm* — Abel Schillinger, LLP

(57) ABSTRACT

The invention is directed to an aqueous adhesive composition for lignocellulosic materials.

18 Claims, 5 Drawing Sheets

(56) References Cited

U.S. PATENT DOCUMENTS

| | | | | |
|---|---|---|---|---|
| 6,706,853 | B1 | 3/2004 | Stanssens et al. | |
| 6,818,699 | B2 | 11/2004 | Kajimaru et al. | |
| 7,265,169 | B2 | 9/2007 | Li et al. | |
| 12,202,851 | B2 * | 1/2025 | Johansson | C07G 1/00 |
| 12,584,019 | B2 * | 3/2026 | De Vries | C08L 97/005 |
| 2004/0034154 | A1 | 2/2004 | Tutin et al. | |
| 2007/0077837 | A1 | 4/2007 | Lundquist | |
| 2007/0173588 | A1 | 7/2007 | Espiard et al. | |
| 2007/0249504 | A1 * | 10/2007 | Ballard | C09K 8/512 507/221 |
| 2009/0098387 | A1 | 4/2009 | Brady et al. | |
| 2009/0169867 | A1 | 7/2009 | Kelly | |
| 2010/0069533 | A1 | 3/2010 | Brady et al. | |
| 2010/0112242 | A1 | 5/2010 | Medoff | |
| 2011/0054154 | A1 * | 3/2011 | Park | C07G 1/00 530/507 |
| 2011/0159768 | A1 * | 6/2011 | Crescimanno | C08J 5/045 524/73 |
| 2013/0065012 | A1 * | 3/2013 | Parker | C09J 189/00 106/155.21 |
| 2013/0210967 | A1 * | 8/2013 | Krueger | C08L 33/02 524/72 |
| 2014/0020597 | A1 * | 1/2014 | Brizius | C09J 197/005 106/18.32 |
| 2014/0030540 | A1 | 1/2014 | Valkonen | |
| 2014/0163142 | A1 | 6/2014 | Zhang et al. | |
| 2015/0252219 | A1 * | 9/2015 | Spyrou | C08G 18/4236 524/591 |
| 2016/0168435 | A1 * | 6/2016 | Amen-Chen | C08G 18/302 524/378 |
| 2016/0244364 | A1 | 8/2016 | Kalliola et al. | |
| 2017/0342574 | A1 * | 11/2017 | Stahl | C08H 6/00 |
| 2018/0133360 | A1 * | 5/2018 | Bingol | C09J 183/04 |
| 2018/0312625 | A1 | 11/2018 | Phanopoulos et al. | |
| 2019/0136062 | A1 | 5/2019 | Alvarado et al. | |
| 2019/0338168 | A1 | 11/2019 | Laine et al. | |
| 2019/0390374 | A1 | 12/2019 | Fournier et al. | |

FOREIGN PATENT DOCUMENTS

| | | | | |
|---|---|---|---|---|
| EP | 0583086 | A | 2/1994 | |
| EP | 0990727 | A1 | 4/2000 | |
| EP | 1741726 | A1 | 1/2007 | |
| EP | 3299421 | A1 | 3/2018 | |
| JP | H0663528 | A * | 3/1994 | |
| JP | 2014065779 | A | 4/2014 | |
| RU | 2345112 | C2 | 1/2009 | |
| WO | 9831763 | A1 | 7/1998 | |
| WO | 9936368 | A1 | 7/1999 | |
| WO | 0105725 | A1 | 1/2001 | |
| WO | 0196460 | A2 | 12/2001 | |
| WO | 0206178 | A1 | 1/2002 | |
| WO | 2004007615 | A1 | 1/2004 | |
| WO | 2006061249 | A1 | 6/2006 | |
| WO | 2008023032 | A1 | 2/2008 | |
| WO | 2008073186 | A2 | 6/2008 | |
| WO | WO-2011042610 | A1 * | 4/2011 | C08L 97/02 |
| WO | 2012113058 | A1 | 8/2012 | |
| WO | 2012136894 | A1 | 10/2012 | |
| WO | 2014080033 | A1 | 5/2014 | |
| WO | 2015049424 | A1 | 4/2015 | |
| WO | 2017067769 | A1 | 4/2017 | |
| WO | 2017188874 | A1 | 11/2017 | |
| WO | 2018122470 | A1 | 7/2018 | |
| WO | 2018138450 | A1 | 8/2018 | |

OTHER PUBLICATIONS

Xiangwei Zhu et al., "Bio-Based Wood Adhesive from Camelina Protein (a Biodiesel Residue) and Depolymerized Lignin with Improved Water Resistance", ACS OMEGA, (Nov. 16, 2017), vol. 2, No. 11, ISSN 2470-1343, pp. 7996-8004.

Richard J.A. Gosselink et al., "Effect of periodate on lignin for wood adhesive application", Holzforschung: International Journal of the Biology, Chemistry, Physics and Technology of Wood, DE, (Jan. 1, 2011), vol. 65, No. 2, ISSN 0018-3830, pp. 155-162.

Venla Hemmilä et al., "Lignin: an adhesive raw material of the future or waste of research energy?", Northern European Network for Wood Science and Engineering (WSE), (Jan. 1, 2013), pp. 98-103.

Masoumeh Ghorbani et al., "Ammoxidized Fenton-Activated Pine Kraft Lignin Accelerates Synthesis and Curing of Resole Resins", Polymers, (Jan. 28, 2017), vol. 9, No. 12, p. 43, p. 54, p. 55.

Dietrich Meier et al., "Conversion of technical lignins into slow-release nitrogenous fertilizers by ammoxidation in liquid phase", Bioresource Technology, (Jan. 1, 1994), pp. 121-128.

U.S. Appl. No. 17/282,128, filed Apr. 1, 2021.

U.S. Appl. No. 17/282,130, filed Apr. 1, 2021.

U.S. Appl. No. 17/282,131, filed Apr. 1, 2021.

Bouajila et al., "Some Laws of Lignin Plasticization", Journal of Applied Polymer Science, vol. 102, 2006, pp. 1445-1451.

"Properties of Hydrogen Peroxide", Editorial board of «Inorganic Chemistry», «Inorganic Chemistry vol. II», Peoples Education Press, 1st Edition, 2nd Print, Oct. 1978, pp. 82-83 (CN).

Urkhanova et al., "Fiber-reinforced concrete with mineral fibers and nanosilica", Procedia Engineering 195 (Jul. 20, 2017), pp. 147-154.

Kuehnel, "Comparison of different cyclic organic carbonates in the oxyalkylation of various types of lignin", Reactive and Functional Polymers 120 (2017) pp. 83-91.

Giummarella, "Fractional profiling of kraft lignin structure: Unravelling insights on lignin reaction mechanisms", ACS Sustainable Chemistry & Engineering, Dec. 16, 2019.

Constant, "New insights into the structure and composition of technical lignins: a comparative characterization study", Green Chemistry, 2016, 18, 251.

More, "A review of lignin hydrogen peroxide oxidation chemistry with emphasis on aromatic aldehydes and acids," De Gruyter, Holzforschung 2021; aop.

Rahimi, "Chemoselective Metal-Free Aerobic Alcohol Oxidation in Lignin," Journal of the American Chemical Society, 2013, pp. 6415-6418.

* cited by examiner

Fig. 4

Properties of technical lignins

| **Lignin Type** | **Sulphur Lignins** | | **Sulphur-free lignins** | |
|---|---|---|---|---|
| | Kraft | Lignosulphate | Soda | Organosolv |
| **Raw materials** | Softwood Hardwood | Softwood Hardwood | Annual plants | Softwood Hardwood Annual Plants |
| **Solubility** | Alkali Organic solvents | Water | Alkali | Wide range of organic solvents |
| **Number-average molar mass ($M_a$-gmol[1])** | 1000-3000 | 15,000-50,000 | 800-3000 | 500-5000 |
| **Polydispersity** | 2.5-3.5 | 6-8 | 2.5-3.5 | 1.5-2.5 |
| **$T_g$ (°C)** | 140-150 | 130 | 140 | 90-110 |

AQUEOUS ADHESIVE COMPOSITION FOR LIGNOCELLULOSIC MATERIALS SUCH AS WOOD AND A METHOD OF PRODUCTION

FIELD OF THE INVENTION

The present invention relates to an aqueous adhesive composition for lignocellulosic materials such as wood and a method of producing a bonded lignocellulosic product which comprises the step of contacting one or more lignocellulosic materials with the adhesive and curing said composition

BACKGROUND OF THE INVENTION

The list of types of adhesives for lignocellulosic materials such as wood is long and contains adhesives such as: aliphatic resin, animal glue, casein, contact cement, epoxy, hot glue, phenol-formaldehyde and urea-formaldehyde.

Each of these has their pros and cons. Some are strong but use harmful material or are expensive, e.g. isocyanate based adhesives; others are cheap, but have low resistance to heat and/or moisture, e.g. poly(vinyl acetate) based adhesives; and others use cheap renewable materials, but have a low bonding strength.

With this oxidized lignin-based adhesive we have a product which has good adhesive properties, use low-cost and renewable resources and is resistant to various conditions such as heat and moisture.

Lignin is mostly used for heat energy by burning it, used as fodder for livestock or simply disposed of as a waste product. A small part of lignin is used in different processes, such as a dispersant in e.g. cement and asphalt, or as a source material for certain aromatic compounds such as vanillin.

One potential use of lignins is the use in adhesives, such as adhesives for wood.

A few adhesive or adhesive-type lignocellulosic products can be found in prior art. JP2014065779 describes a resin composition comprising an organic solvent-soluble lignin in combination with compounds containing a plurality of oxazoline rings. WO18138450 describes lignin-based fibre boards, to be used for carbon fibres produced from bio-based materials, where non-chemically modified lignin, plasticizer and a cross-linking agent are melt-extruded, and then carbonization treated to form said carbon fibres. US2009169867 describes a composite material comprising a substrate material and a cured/dried adhesive composition of polymer particles, defatted soy flour, any mixture of the following cross-linking agents: glycerol, glycerol derivatives, diethanolamine, triethanolamine, pentaerythritol, hydroxy alkyl urea, urea, oxazoline, polyvinyl alcohol, zirconium or zinc metal ions; This patent also addresses the addition of lignin or ligninsulphonate, which in this case would occur to act as an extender or filler.

US2010069533 describes a wood composite bonded with a wood adhesive composition comprising any mixture of soy protein isolate, soy flour, ground flax meal, flax flour, hemp flour and flour from grains; a component containing one or more oxazoline-functional groups and possibly lignin or lignosulphonate and/or an acid generator compound. It is important to note that US2010069533 does not describe any plasticizers; it does not describe any chemical treatment of the lignin or lignosulphonate, such as oxidation and it does not use lignin or lignosulphonate as the main component.

US2011159768 describes an aqueous adhesive composition comprising a component of one or more ethylenically unsaturated carboxy acid-grafted lignins or lignosulphonates and a component of one or more oxazoline-functional group containing polymers or resins. It is important to note that US2011159768 describes an aqueous adhesive composition containing significantly differently chemically treated lignins or lignosulphonates relative to the current invention and it does not describe the use of plasticizers or oxidation.

There are several important characteristics of lignin in relation to adhesives. Lignin is an aromatic polymer with high glass transition temperature ($T_g$). Lignin thermally decomposes over a wide range of temperatures as different oxygen containing moieties possess different stability and reactions that are occurring can be consecutive but also competing due to hindered structure of lignin polymer. Lignin surface chemistry properties (like surface tension components) are similar to the same properties of cured phenol formaldehyde (PF) adhesives. This situation makes the reasonable assumption that adhesion properties of lignin can be at a similar level as those of long time used PF adhesives in wood products and similar. However, lignin is an inherently heterogeneous material and on top of that, the properties and structure of lignin are different based on various techniques being employed in extracting lignin from biomass, as well as the biomass itself. The differences come in terms of structure, bonding pattern of lignin aromatic units, molecular weight, functional groups etc.

The reactive functional group being present in high amounts in a typical lignin is the hydroxyl group, being either phenolic or aliphatic hydroxyl group. The presence of phenolic hydroxyl group also activates the aromatic ring towards reactions with aldehydes. Overall, it can be said that lignin structure limits the choice of cross-linkers to most often environmentally compromised reagents and therefore limits the possibility to use lignin as a starting material in processes which include chemical reactions.

In order to utilize lignins as starting materials for different uses, chemical derivatizations of lignins have been proposed. One of the proposed ways of derivatizing lignin is oxidation. Oxidation of lignin is usually carried out with strong oxidation agents in the presence of alkali metal hydroxides.

SUMMARY OF THE INVENTION

Accordingly, it was an object of the present invention to provide an adhesive which is particularly suitable for adhesion towards lignocellulosic materials such as wood, uses renewable materials as starting materials, reduces or eliminates corrosive and/or harmful materials, and is comparatively inexpensive to produce.

A further object of the present invention was to provide a product adhered with such an adhesive.

In accordance with a first aspect of the present invention, there is provided an aqueous adhesive composition for lignocellulosic materials such as wood comprising:

a component (i) in form of one or more oxidized lignins;

a component (ii) in form of one or more cross-linkers.

a component (iii) in form of one or more plasticizers.

In accordance with a second aspect of the present invention, there is provided a method of producing a lignocellulosic product which comprises the step of contacting one or more lignocellulosic material with the aqueous adhesive composition described above.

In accordance with a third aspect of the present invention, there is provided a lignocellulosic product, comprising one or more lignocellulosic materials in contact with the cured adhesive composition according to the present invention.

The present inventors have surprisingly found that it is possible to obtain a lignocellulosic product adhered as the result of the curing of an adhesive, whereby the main component of the adhesive is oxidized lignin as the main component; produced from inexpensive renewable materials to a large degree, which does not contain, or contains only to a minor degree, any corrosive and/or harmful agents.

BRIEF DESCRIPTION OF THE DRAWINGS

In the drawings,

FIG. 4 shows a summary of the properties of technical lignins; and

DESCRIPTION OF THE PREFERRED EMBODIMENTS

The aqueous adhesive composition for lignocellulosic materials such as wood according to the present invention comprises a component (i) in form of one or more oxidized lignins;

a component (ii) in form of one or more cross-linkers;

a component (iii) in form of one or more plasticizers.

In a preferred embodiment, the adhesives according to the present invention are formaldehyde free.

For the purpose of the present application, the term "formaldehyde free" defines that no formaldehyde is added during the preparation of the adhesive composition.

Component (i)

Component (i) is in form of one or more oxidized lignins.

Lignin, cellulose and hemicellulose are the three main organic compounds in a plant cell wall. Lignin can be thought of as the glue, which holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

Figure 1:
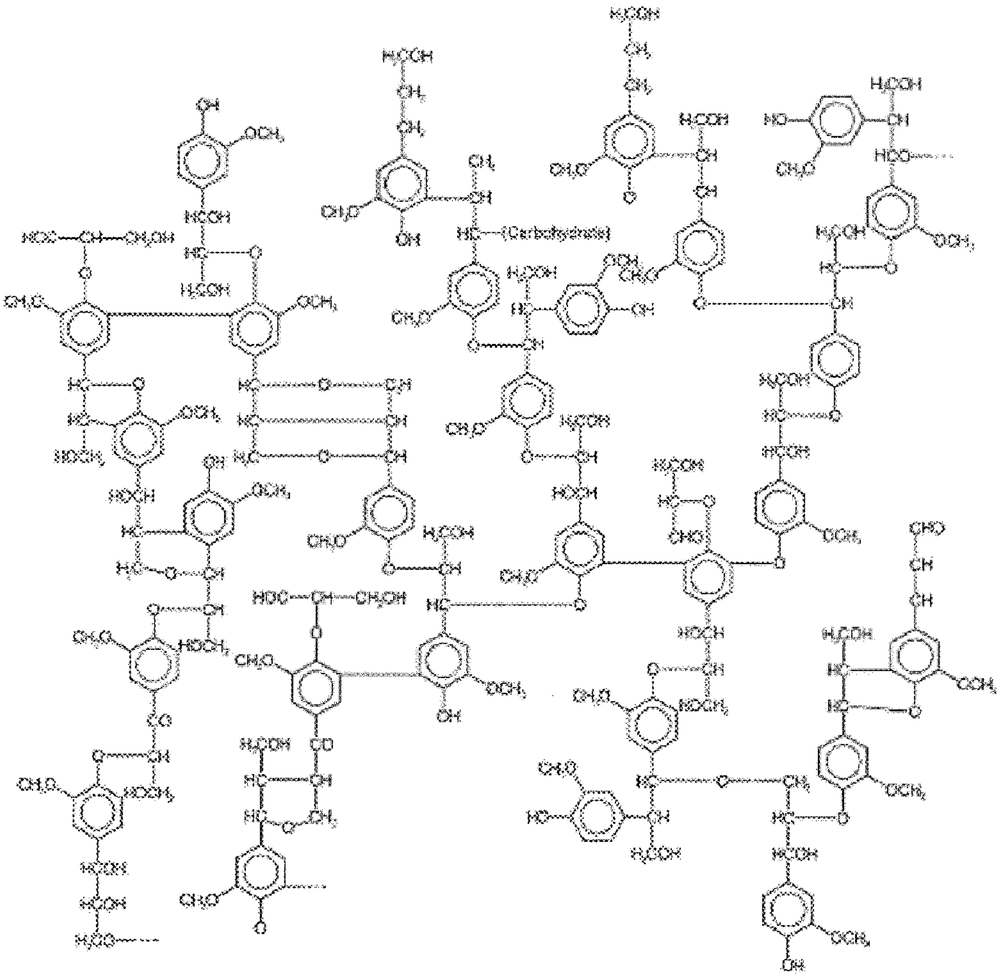
FIG. 1 shows a section from a possible lignin structure.

FIG. 1 shows a section from a possible lignin structure.

Figure 2:
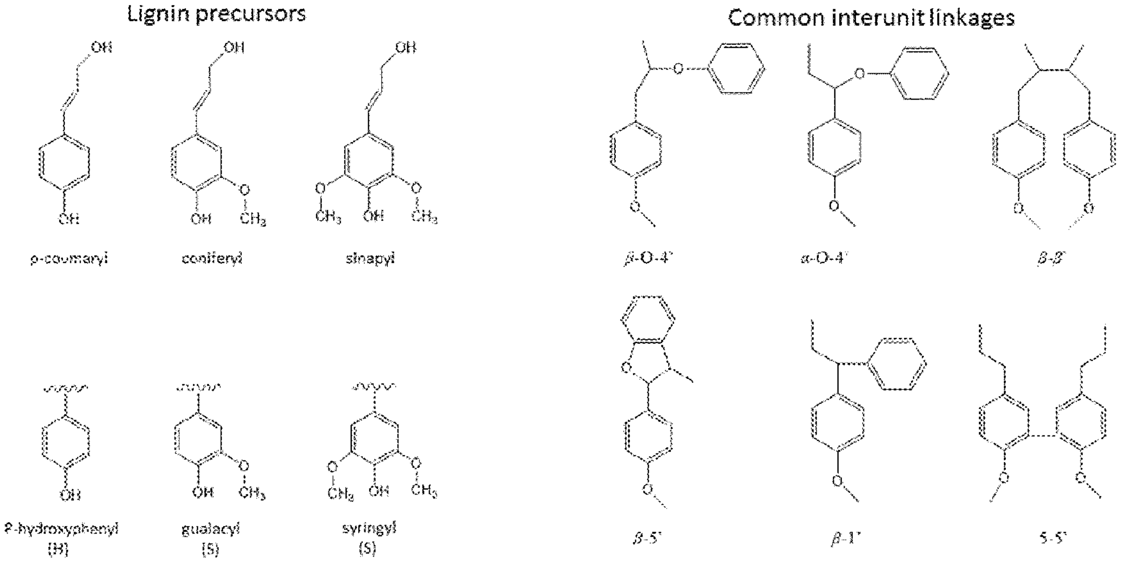
FIG. 2 shows structures of lignin precursors and common interunit linkages.
Figure 3:
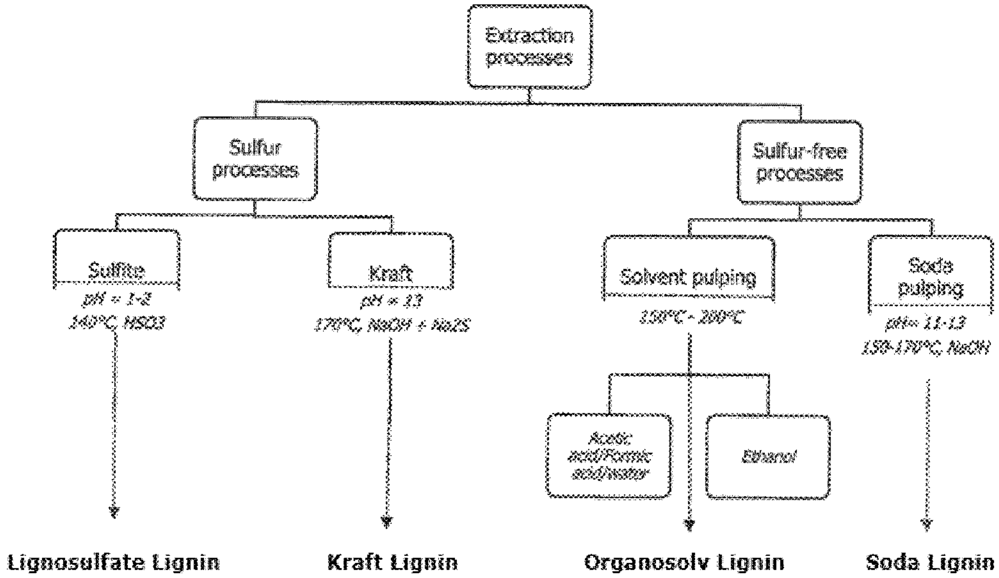
FIG. 3 shows four groups of technical lignins available on the market and the ways in which they are obtained.

There are at least four groups of technical lignins available in the market. These four groups are shown in FIG. 3. A possible fifth group, Biorefinery lignin, is a bit different as it is not described by the extraction process, but instead by the process origin, e.g. biorefining and it can thus be similar or different to any of the other groups mentioned. Each group is different from each other and each is suitable for different applications. Lignin is a complex, heterogenous material composed of up to three different phenyl propane monomers, depending on the source. Softwood lignins are made mostly with units of coniferyl alcohol, see FIG. 2 and as a result, they are more homogeneous than hardwood lignins, which has a higher content of syringyl alcohol, see FIG. 2. The appearance and consistency of lignin are quite variable and highly contingent on process.

A summary of the properties of these technical lignins is shown in FIG. 4.

Lignosulphonate from the sulphite pulping process remains the largest commercial available source of lignin, with capacity of 1.4 million tonnes. But taking these aside, the kraft process is currently the most used pulping process and is gradually replacing the sulphite process. An estimated 78 million tonnes per year of lignin are globally generated by kraft pulp production but most of it is burned for steam and energy. Current capacity for kraft recovery is estimated at 160,000 tonnes, but sources indicate that current recovery is only about 75,000 tonnes. Kraft lignin is developed from black liquor, the spent liquor from the sulphate or kraft process. At the moment, 3 well-known processes are used to produce the kraft lignin: LignoBoost, LignoForce and SLRP. These 3 processes are similar in that they involve the addition of $CO_2$ to reduce the pH to 9-10, followed by acidification to reduce pH further to approximately 2. The final step involves some combination of washing, leaching and filtration to remove ash and other contaminants. The three processes are in various stages of commercialization globally.

The kraft process introduces thiol groups, stilbene while some carbohydrate remain. Sodium sulphate is also present as an impurity due to precipitation of lignin from liquor with sulphuric acid but can potentially be avoided by altering the way lignin is isolated. The kraft process leads to high amount of phenolic hydroxyl groups and this lignin is soluble in water when these groups are ionized (above pH~10).

Commercial kraft lignin is generally higher in purity than lignosulphonates. The molecular weight is 1000-3000 g/mol.

Soda lignin originates from sodium hydroxide pulping processes, which are mainly used for wheat straw, bagasse and flax. Soda lignin properties are similar to kraft lignins one in terms of solubility and $T_g$. This process does not utilize sulphur and there is no covalently bound sulphur. The ash level is very low. Soda lignin has a low solubility in neutral and acid media but is completely soluble at pH 12 and higher.

The lignosulphonate process introduces large amount of sulphonate groups making the lignin soluble in water but also in acidic water solutions. Lignosulphonates has up to 8% sulphur as sulphonate, whereas kraft lignin has 1-2% sulphur, mostly bonded to the lignin. The molecular weight of lignosulphonate is 15.000-50.000 g/mol. This lignin contains more leftover carbohydrates compared to other types and has a higher average molecular weight. The typical hydrophobic core of lignin together with large number of ionized sulphonate groups make this lignin attractive as a surfactant and it often finds application in dispersing cement etc.

A further group of lignins becoming available is lignins resulting from biorefining processes in which the carbohydrates are separated from the lignin by chemical or biochemical processes to produce a carbohydrate rich fraction. This remaining lignin is referred to as biorefinery lignin. Biorefineries focus on producing energy, and producing substitutes for products obtained from fossil fuels and petrochemicals as well as lignin. The lignin from this process is in general considered a low value product or even a waste product mainly used for thermal combustion or used as low grade fodder or otherwise disposed of.

Organosolv lignin availability is still considered on the pilot scale. The process involves extraction of lignin by using water together with various organic solvents (most often ethanol) and some organic acids. An advantage of this process is the higher purity of the obtained lignin but at a much higher cost compared to other technical lignins and with the solubility in organic solvents and not in water.

Previous attempts to use lignin as a basic compound for adhesive compositions for lignocellulosic materials failed because it proved difficult to find suitable cross-linkers which would achieve desirable mechanical properties of the cured mineral wool product and at the same time avoid harmful and/or corrosive components. Presently lignin is used to replace oil derived chemicals, such as phenol in phenolic resins in adhesive applications or in bitumen. It is also used as cement and concrete additives and in some aspects as dispersants.

The cross-linking of a polymer in general should provide improved properties like mechanical, chemical and thermal resistance etc. Lignin is especially abundant in phenolic and aliphatic hydroxyl groups that can be reacted, leading to cross-linked structure of lignin. Different lignins will also have other functional groups available that can potentially be used. The existence of these other groups is largely dependent on the way lignin was separated from cellulose and hemicellulose (thiols in kraft lignin, sulphonates in lignosulphonate etc.) depending on the source.

The cross-linking potential of hydroxyl groups is relatively limited. Lignin is of course very reactive to isocyanates and can build polyurethanes. However, polyurethanes are of lesser interest due to toxicity of isocyanates. Similarly, phenolic hydroxyls can react in ring opening with epoxides and participate in standard epoxy/amine curing, but again epoxides are of lesser interest due to toxicity. Phenolic hydroxyls activate the aromatic rings to react in standard phenolic resins using aldehydes as cross-linkers, but again this is of lesser interest due to the toxicity of aldehydes. For example, it is well-known to cross-link lignins with aldehydes, see EP3299421 A1 disclosing an adhesive comprising lignin, glutaraldehyde, ammonia, glucose and lysine. Several examples of lignin adhesives comprising formaldehyde are also known, such as WO14080033 and U.S. Pat. No. 3,227,667.

The present inventors have surprisingly found that by using oxidized lignins, adhesive compositions for lignocellulosic materials can be prepared which allow excellent properties of the bonded lignocellulosic product produced therewith and at the same time do not require harmful and/or corrosive components to be included into the adhesive compositions.

In one embodiment, the component (i) is in form of one or more oxidized kraft lignins.

In one embodiment, the component (i) is in form of one or more oxidized soda lignins.

In one embodiment, the component (i) is in form of one or more ammonia-oxidized lignins. For the purpose of the present invention, the term "ammonia-oxidized lignins" is to be understood as a lignin that has been oxidized by an oxidation agent in the presence of ammonia. The term "ammonia-oxidized lignin" is abbreviated as AOL.

In an alternative embodiment, the ammonia is partially or fully replaced by an alkali metal hydroxide, in particular sodium hydroxide and/or potassium hydroxide.

A typical oxidation agent used for preparing the oxidized lignins is hydrogen peroxide.

In one embodiment, the ammonia-oxidized lignin comprises one or more of the compounds selected from the group of ammonia, amines, hydroxides or any salts thereof.

In one embodiment, the component (i) is having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i).

In one embodiment, the component (i) is having an average carboxylic acid group content of more than 1.5 groups per macromolecule of component (i), such as more than 2 groups, such as more than 2.5 groups.

Without wanting to be bound by any particular theory, the present inventors believe that the carboxylic acid group content of the oxidized lignins plays an important role in the surprising advantages of the aqueous adhesive compositions for lignocellulosic materials according to the present invention. In particular, the present inventors believe that the carboxylic acid group of the oxidized lignins improve the cross-linking properties and therefore allow better mechanical properties of the cured bonded lignocellulosic products.

Component (ii)

Component (ii) is in form of one or more cross-linkers.

The component (ii) is in one embodiment in form of one or more cross-linkers selected from β-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the β-hydroxyalkylamide-cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing cross-linkers can easily be obtained by polymerizing an oxazoline derivative. The patent U.S. Pat. No. 6,818,699 B2 provides a disclosure for such a process.

In one embodiment, the component (ii) is one or more cross-linkers selected from the group consisting of multifunctional organic amines such as an alkanolamine, diamines, such as hexamethyldiamine, triamines.

In one embodiment, the component (ii) is an epoxidized oil based on fatty acid triglyceride.

It is noted that epoxidized oils based on fatty acid triglycerides are not considered hazardous and therefore the use of these compounds in the adhesive compositions according to the present invention do not render these compositions unsafe to handle.

In one embodiment, the component (ii) is a molecule having 3 or more epoxy groups.

In one embodiment, the component (ii) is one or more flexible oligomer or polymer, such as a low $T_g$ acrylic based polymer, such as a low $T_g$ vinyl based polymer, such as low $T_g$ polyether, which contains reactive functional groups such as carbodiimide groups, such as anhydride groups, such as oxazoline groups, such as amino groups, such as epoxy groups.

In one embodiment, component (ii) is selected from the group consisting of cross-linkers taking part in a curing reaction, such as hydroxyalkylamide, alkanolamine, a reaction product of an alkanolamine and a polycarboxylic acid. The reaction product of an alkanolamine and a polycarboxylic acid can be found in U.S. Pat. No. 6,706,853B1.

Without wanting to be bound by any particular theory, the present inventors believe that the very advantageous properties of the aqueous adhesive compositions according to the present invention are due to the interaction of the oxidized lignins used as component (i) and the cross-linkers mentioned above. It is believed that the presence of carboxylic acid groups in the oxidized lignins enable the very effective cross-linking of the oxidized lignins. It is a further advantageous effect that the β-hydroxyalkylamide-cross-linkers and oxazoline-cross-linkers which are preferably used as cross-linkers in the aqueous adhesive composition according to the present invention are non-harmful, in particular non-toxic and non-corrosive. These cross-linkers interact very effectively with the oxidized lignins containing increased amounts of carboxylic acid groups, thereby enabling the advantageous mechanical properties of the bonded lignocellulosic products according to the present invention.

In one embodiment, the adhesive composition according to the present invention comprises component (ii) in an amount of 1 to 40 wt.-%, such as 4 to 20 wt.-%, such as 6 to 12 wt.-%, based on the dry weight of component (i).

Component (iii)

Component (iii) is in form of one or more plasticizers.

It has surprisingly been found that the inclusion of plasticizers in the aqueous adhesive compositions according to the present invention strongly improves the mechanical properties of the bonded lignocellulosic products according to the present invention.

The term plasticizer refers to a substance that is added to a material in order to make the material softer, more flexible (by decreasing the glass-transition temperature $T_g$) and easier to process.

In one embodiment, component (iii) is in form of one or more plasticizers selected from the group consisting of polyethylene glycols, polyethylene glycol ethers, polyethers, hydrogenated sugars, phthalates and/or acids, such as adipic acid, vanillic acid, lactic acid and/or ferullic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups.

In one embodiment, component (iii) is in form of one or more plasticizers selected from the group consisting of carbonates, such as ethylene carbonate, propylene carbonate, lactones, lactams, lactides, compounds with a structure similar to lignin like vanilin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferullic acid, polyurethane dispersions, acrylic based polymers with free carboxy groups, compounds with a structure similar to lignin like vanilin, acetosyringone.

In one embodiment, component (iii) is in form of one or more plasticizers selected from the group consisting of polyethylene glycols, polyethylene glycol ethers.

Another particular surprising aspect of the present invention is that the use of plasticizers like polyethylene glycols and polyethylene glycol ethers having a boiling point of more than 100° C., in particular 140 to 250° C., strongly improve the mechanical properties of the bonded lignocellulosic products according to the present invention although, in view of their boiling point, it is likely that these plasticizers will at least in part evaporate during the curing of the aqueous adhesives in contact with the lignocellulosic materials.

In one embodiment, component (iii) is in form of one or more plasticizers having a boiling point of more than 100° C., such as 110 to 280° C., more preferred 120 to 260° C., more preferred 140 to 250° C.

Without wanting to be bound by any particular theory, the present inventors believe that the effectiveness of these plasticizers in the aqueous adhesive composition according to the present invention is associated with the effect of increasing the mobility of the oxidized lignins during the curing process whereby at the same time they evaporate in the course of this curing process. It is believed that the increased mobility of the lignins or oxidized lignins during the curing process facilitates the effective cross-linking. A further advantage of this aspect is that almost no plasticizer is present in the cured bonded lignocellulosic product so that no side effect hereof; e.g., water absorption or change of mechanical properties with aging are present in the cured bonded lignocellulosic product.

In one embodiment, component (iii) is in form of one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) is in form of one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. water absorption in the cured product. Non-limiting examples of such a component are caprolactone and acrylic based polymers with free carboxyl groups.

In one embodiment, component (iii) is present in an amount of 0.5 to 50, preferably 2.5 to 25, more preferably 3 to 15 wt.-%, based on the dry weight of component (i).

Aqueous Adhesive Composition for Lignocellulosic Materials Comprising Components (i) and (iia)

In one embodiment the present invention is directed to an aqueous adhesive composition for lignocellulosic materials comprising:

a component (i) in form of one or more oxidized lignins;

a component (iia) in form of one or more modifiers.

The present inventors have found that the excellent adhesive properties can also be achieved by a two-component system which comprises component (i) in form of one or more oxidized lignins and a component (iia) in form of one or more modifiers, and optionally any of the other components mentioned above and below.

In a preferred embodiment, component (iia) is a modifier in form of one or more compounds selected from the group consisting of epoxidized oils based on fatty acid triglycerides.

In one embodiment, component (iia) is a modifier in form of one or more compounds selected from molecules having 3 or more epoxy groups.

In one embodiment, component (iia) is a modifier in form of one or more flexible oligomer or polymer, such as a low $T_g$ acrylic based polymer, such as a low $T_g$ vinyl based polymer, such as low $T_g$ polyether, which contains reactive functional groups such as carbodiimide groups, such as anhydride groups, such as oxazoline groups, such as amino groups, such as epoxy groups.

Without wanting to be bound by any particular theory, the present inventors believe that the excellent adhesive properties achieved by the adhesive composition for lignocellulosic materials comprising components (i) and (iia), and optional further components, are at least partly due to the effect that the modifiers used as components (iia) at least partly serve the function of a plasticizer and a cross-linker.

In one embodiment, the aqueous adhesive composition comprises component (iia) in an amount of 1 to 40 wt.-%, such as 4 to 20 wt.-%, such as 6 to 12 wt.-%, based on the dry weight of the component (i).

Further Components

In some embodiments, the aqueous adhesive composition according to the present invention comprises further components.

In one embodiment, the aqueous adhesive composition according to the present invention comprises a catalyst selected from inorganic acids, such as sulphuric acid, sulphamic acid, nitric acid, boric acid, hypophosphorous acid, and/or phosphoric acid, and/or any salts thereof such as sodium hypophosphite, and/or ammonium salts, such as ammonium salts of sulphuric acid, sulphamic acid, nitric acid, boric acid, hypophosphorous acid, and/or phosphoric acid. The presence of such a catalyst can improve the curing properties of the aqueous adhesive compositions according to the present invention.

In one embodiment, the aqueous adhesive composition according to the present invention comprises a catalyst selected from Lewis acids, which can accept an electron pair from a donor compound forming a Lewis adduct, such as $ZnCl_2$, Mg $(ClO_4)_2$, Sn $[N(SO_2\text{-n-}C_8F_{17})_2]_4$.

In one embodiment, the aqueous adhesive composition according to the present invention comprises a catalyst selected from metal chlorides, such as KCl, $MgCl_2$, $ZnCl_2$, $FeCl_3$ and $SnCl_2$.

In one embodiment, the aqueous adhesive composition according to the present invention comprises a catalyst selected from organometallic compounds, such as titanate-based catalysts and stannum based catalysts.

In one embodiment, the aqueous adhesive composition according to the present invention comprises a catalyst selected from chelating agents, such as transition metals, such as iron ions, chromium ions, manganese ions, copper ions. In one embodiment, the aqueous adhesive composition according to the present invention further comprises a component in form of one or more components selected from the group of ammonia, amines or any salts thereof.

The present inventors have found that the inclusion of ammonia, amines or any salts thereof as a further component can in particular be useful when oxidized lignins are used in component (i), which oxidized lignin have not been oxidized in the presence of ammonia.

In one embodiment, the aqueous adhesive composition according to the present invention further comprises a further component in form of urea, in particular in an amount of 5 to 40 wt.-%, such as 10 to 30 wt.-%, 15 to 25 wt.-%, based on the dry weight of component (i).

In one embodiment, the aqueous adhesive composition according to the present invention further comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the aqueous adhesive composition according to the present invention further comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In the context of the present invention, an adhesive composition having a sugar content of 50 wt.-% or more, based on the total dry weight of the adhesive components, is considered to be a sugar based adhesive. In the context of the present invention, an adhesive composition having a sugar content of less than 50 wt.-%, based on the total dry weight of the adhesive components, is considered a non-sugar based adhesive.

In one embodiment, the aqueous adhesive composition according to the present invention further comprises a further component in form of one or more surface active agents that are in the form of non-ionic and/or ionic emulsifiers such as polyoxyethylene (4) lauryl ether, such as soy lechitin, such as sodium dodecyl sulfate.

In one embodiment, the aqueous adhesive composition according to the present invention comprises a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);

a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;

a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous adhesive composition comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the aqueous adhesive composition according to the present invention comprises a component (i) in form of one or more ammonia-oxidized lignins having a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (i);

a component (iia) in form of one or more modifiers selected from epoxidized oils based on fatty acid triglycerides.

In one embodiment, the aqueous adhesive composition according to the present invention comprises a component (i) in form of one or more ammonia-oxidized lignins having an average carboxylic acid group content of more than 1.5 groups per macromolecule of component (i), such as more than 2 groups, such as more than 2.5 groups;

a component (ii) in form of one or more cross-linkers selected from β-hydroxyalkylamide-cross-linkers and/or oxazoline-cross-linkers and/or is one or more cross-linkers selected from the group consisting of multifunctional organic amines such as an alkanolamine, diamines, such as hexamethyldiamine, triamines;

a component (iii) in form of one or more polyethylene glycols having an average molecular weight of 150 to 50000 g/mol, in particular 150 to 4000 g/mol, more particular 150 to 1000 g/mol, preferably 150 to 500 g/mol, more preferably 150 to 300 g/mol, or one or more polyethylene glycols having an average molecular weight of 4000 to 25000 g/mol, in particular 4000 to 15000 g/mol, more particular 8000 to 12000 g/mol; wherein preferably the aqueous adhesive composition comprises component (ii) in an amount of 1 to 40 wt.-%, such as 4 to 20 wt.-%, 6 to 12 wt.-%, based on the dry weight of component (i), and (iii) is present in an amount of 0.5 to 50, preferably 2.5 to 25, more preferably 3 to 15 wt.-%, based on the dry weight of component (i).

In one embodiment, the aqueous adhesive composition according to the present invention comprises a component (i) in form of one or more ammonia-oxidized lignins having an average carboxylic acid group content of more than 1.5 groups per macromolecule of component (i), such as more than 2 groups, such as more than 2.5 groups;

a component (iia) in form of one or more modifiers selected from epoxidized oils based on fatty acid triglycerides.

In one embodiment, the aqueous adhesive composition according to the present invention consists essentially of a component (i) in form of one or more oxidized lignins;

a component (ii) in form of one or more cross-linkers;

a component (iii) in form of one or more plasticizers;

optionally a component in form of one or more compounds selected from the group of ammonia, amines or any salts thereof;

optionally a component in form of urea;

optionally a component in form of a more reactive or non-reactive silicones;

optionally a hydrocarbon oil;

optionally one or more surface active agents;

water.

In one embodiment, the aqueous adhesive composition according to the present invention consists essentially of a component (i) in form of one or more oxidized lignins;

a component (iia) in form of one or more modifiers selected from epoxidized oils based on fatty acid triglycerides;

optionally a component in form of one or more compounds selected from the group of ammonia, amines or any salts thereof;

optionally a component in form of urea;

optionally a component in form of a more reactive or non-reactive silicones;

optionally a hydrocarbon oil;

optionally one or more surface active agents;

water.

A Method for Producing a Bonded Lignocellulosic Product

The present invention also provides a method for producing a bonded lignocellulosic product by binding one or more lignocellulosic material with the adhesive composition.

Accordingly, the present invention is also directed to a method of producing a bonded lignocellulosic product which comprises the step of contacting one or more lignocellulosic materials with the adhesive composition comprising a component (i) in form of one or more oxidized lignins;

a component (ii) in form of one or more cross-linkers;

a component (iii) in form of one or more plasticizers.

Examples of lignocellulosic material products include but are not limited to medium-density fibreboards, oriented strand boards, chipboards, glued laminated timber, plywood.

The method comprises steps of contacting lignocellulosic materials with an adhesive composition comprising a component (i) in form of one or more oxidized lignins;

a component (ii) in form of one or more crosslinkers;

a component (iii) in form of one or more plasticizers.

Examples of lignocellulosic materials include but are not limited to solid wood, wood fibres, sawdust, paper, straw.

In the method, components of the present invention are thoroughly mixed together before bringing the mixture into contact with the lignocellulosic materials.

The adhesive composition of the present invention can be brought into contact with the lignocellulosic material in various ways such as by spreading, such as by spraying, such as by mixing etc.

After contact is made, the lignocellulosic material is pressed for a specific time and with a specific pressure. In one embodiment, pressure level used is from 0.1 to 10 MPa, such as from 0.5 to 6 MPa. In one embodiment, pressing takes place for a time of 30 seconds to 20 minutes, such as 2 to 10 minutes. Pressing is commonly performed in a hot press at above room temperature from 100 to 250° C., such as from 140 to 180° C.

Bonded Lignocellulosic Product According to the Present Invention

The present invention is also directed to a bonded lignocellulosic product, comprising one or more lignocellulosic materials in contact with the cured adhesive composition described above.

Oxidized Lignins which Can Be Used as Component (i) in the Aqueous Adhesive Composition for Lignocellulosic Materials According to the Present Invention and Method for Preparing Such Oxidized Lignins In the following, we describe oxidized lignins which can be used as component (i) and their preparation.

Oxidized lignins, which can be used as component (i) for the adhesives according to the present invention can be prepared by a method comprising bringing into contact a component (a) comprising one or more lignins a component (b) comprising ammonia, one or more amine components, and/or any salt thereof.

a component (c) comprising one or more oxidation agents.

Component (a)

Component (a) comprises one or more lignins.

In one embodiment of the method according to the present invention, component (a) comprises one or more kraft lignins, one or more soda lignins, one or more lignosulphonate lignins, one or more organosolv lignins, one or more lignins from biorefining processes of lignocellulosic feedstocks, or any mixture thereof.

In one embodiment, component (a) comprises one or more kraft lignins.

Component (b)

In one embodiment according to the present invention, component (b) comprises ammonia, one or more amino components, and/or any salts thereof. Without wanting to be bound by any particular theory, the present inventors believe that replacement of the alkali hydroxides used in previously known oxidation processes of lignin by ammonia, one or more amino components, and/or any salts thereof, plays an important role in the improved properties of the oxidized lignins prepared according to the method of the present invention.

The present inventors have surprisingly found that the lignins oxidized by an oxidation agent in the presence of ammonia or amines contain significant amounts of nitrogen as a part of the structure of the oxidized lignins. Without wanting to be bound to any particular theory, the present inventors believe that the improved fire resistance properties of the oxidized lignins when used in products where they are comprised in an adhesive composition, said oxidized lignins prepared by the method according to the present invention, are at least partly due to the nitrogen content of the structure of the oxidized lignins.

In one embodiment, component (b) comprises ammonia and/or any salt thereof.

Without wanting to be bound by any particular theory, the present inventors believe that the improved stability properties of the derivatized lignins prepared according to the present invention are at least partly due to the fact that ammonia is a volatile compound and therefore evaporates from the final product or can be easily removed and reused. In contrast to that, it has proven difficult to remove residual amounts of the alkali hydroxides used in the previously known oxidation process.

Nevertheless, it can be advantageous in the method according to the present invention that component (b), besides ammonia, one or more amino components, and/or any salts thereof, also comprises a comparably small amount of an alkali and/or earth alkali metal hydroxide, such as sodium hydroxide and/or potassium hydroxide.

In the embodiments, in which component (b) comprises alkali and/or earth alkali metal hydroxides, such as sodium hydroxide and/or potassium hydroxide, as a component in addition to the ammonia, one or more amino components, and/or any salts thereof, the amount of the alkali and/or earth alkali metal hydroxides is usually small, such as 5 to 70 weight parts, such as 10 to 20 weight parts alkali and/or earth alkali metal hydroxide, based on ammonia.

Component (c)

In the method according to the present invention, component (c) comprises one or more oxidation agents.

In one embodiment, component (c) comprises one or more oxidation agents in form of hydrogen peroxide, organic or inorganic peroxides, molecular oxygen, ozone, halogen containing oxidation agents, or any mixture thereof.

In the initial steps of the oxidation, active radicals from the oxidant will typically abstract the proton from the phenolic group as that bond has the lowest dissociation energy in lignin. Due to lignin's potential to stabilize radicals through mesomerism multiple pathways open up to continue (but also terminate) the reaction and various intermediate and final products are obtained. The average molecular weight can both increase and decrease due to this complexity (and chosen conditions) and in their experiments, the inventors have typically seen moderate increase of average molecular weight of around 30%.

In one embodiment, component (c) comprises hydrogen peroxide.

Hydrogen peroxide is perhaps the most commonly employed oxidant due to combination of low price, good efficiency and relatively low environmental impact. When hydrogen peroxide is used without the presence of catalysts, alkaline conditions and temperature are important due to the following reactions leading to radical formation:

$$H_2O_2 + OH^- \rightleftarrows HOO^- + H_2O$$

$$H_2O_2 + OOH^- \rightleftarrows \bullet OH + H_2O + \bullet O_2^-$$

The present inventors have found that the derivatized lignins prepared with the method according to the present invention contain increased amounts of carboxylic acid groups as a result of the oxidation process. Without wanting to be bound by any particular theory, the present inventors believe that the carboxylic acid group content of the oxidized lignins prepared in the process according to the present invention plays an important role in the desirable reactivity properties of the derivatized lignins prepared by the method according to the present invention.

Another advantage of the oxidation process is that the oxidized lignin is more hydrophilic. Higher hydrophilicity can enhance solubility in water and facilitate the adhesion to polar substrates such as lignocellulosic materials.

Further Components

In one embodiment, the method according to the present invention comprises further components, in particular a component (d) in form of an oxidation catalyst, such as one or more transition metal catalyst, such as iron sulphate, such as manganese, palladium, selenium, tungsten containing catalysts.

Such oxidation catalysts can increase the rate of the reaction, thereby improving the properties of the oxidized lignins prepared by the method according to the present invention.

Mass Ratios of the Components

The person skilled in the art will use the components (a), (b) and (c) in relative amounts that the desired degree of oxidation of the lignins is achieved.

In one embodiment, a component (a) comprises one or more lignins a component (b) comprises ammonia a component (c) comprises one or more oxidation agents in form of hydrogen peroxide, wherein the mass ratios of lignin, ammonia and hydrogen peroxide are such that the amount of ammonia is 0.01 to 0.5 weight parts, such as 0.1 to 0.3, such as 0.15 to 0.25 weight parts ammonia, based on the dry weight of lignin, and wherein the amount of hydrogen peroxide is 0.025 to 1.0 weight parts, such as 0.05 to 0.2 weight parts, such as 0.075 to 0.125 weight parts hydrogen peroxide, based on the dry weight of lignin.

Process

There is more than one possibility to bring the components (a), (b) and (c) in contact to achieve the desired oxidation reaction.

In one embodiment, the method comprises the steps of:

a step of providing component (a) in form of an aqueous solution and/or dispersion of one more lignins, the lignin content of the aqueous solution being 1 to 50 wt.-%, such as 5 to 25 wt.-%, such as 15 to 22 wt.-%, such as 18 to 20 wt.-%, based on the total weight of the aqueous solution;

a pH adjusting step by adding component (b) comprising an aqueous solution of ammonia, one or more amine components, and/or any salt thereof;

an oxidation step by adding component (c) comprising an oxidation agent.

In one embodiment, the pH adjusting step is carried so that the resulting aqueous solution and/or dispersion is having a pH≥9, such as ≥10, such as ≥10.5.

In one embodiment, the pH adjusting step is carried out so that the resulting aqueous solution and/or dispersion is having a pH in the range of 10.5 to 12.

In one embodiment, the pH adjusting step is carried out so that the temperature is allowed to raise to ≥25° C. and then controlled in the range of 25-50° C., such as 30-45° C., such as 35-40° C.

In one embodiment, during the oxidation step, the temperature is allowed to raise ≥35° C. and is then controlled in the range of 35-150° C., such as 40-90° C., such as 45-80° C.

In one embodiment, the oxidation step is carried out for a time of 1 second to 48 hours, such as 10 seconds to 36 hours, such as 1 minute to 24 hours such as 2-5 hours.

Reaction Product

The present invention is also directed to oxidized lignins prepared by the method according to the present invention.

The present inventors have surprisingly found that the oxidized lignins prepared according to the method of the present invention have very desirable reactivity properties and at the same time display improved fire resistance properties when used in products where they are comprised in an adhesive composition, and improved long term stability over previously known oxidized lignins.

The oxidized lignin also displays improved hydrophilicity.

An important parameter for the reactivity of the oxidized lignins prepared by the method according to the present invention is the carboxylic acid group content of the oxidized lignins.

In one embodiment, the oxidized lignin prepared according to the present invention has a carboxylic acid group content of 0.05 to 10 mmol/g, such as 0.1 to 5 mmol/g, such as 0.20 to 1.5 mmol/g, such as 0.40 to 1.2 mmol/g, such as 0.45 to 1.0 mmol/g, based on the dry weight of component (a).

Another way to describe the carboxylic acid group content is by using average carboxylic acid group content per lignin macromolecule according to the following formula:

$$\text{Average COOH functionality} = \frac{\text{total moles COOH}}{\text{total moles lignin}}$$

In one embodiment, the oxidized lignin prepared according to the present invention has an average carboxylic acid group content of more than 1.5 groups per macromolecule of component (a), such as more than 2 groups, such as more than 2.5 groups.

The following examples are intended to further illustrate the invention without limiting its scope.

EXAMPLES

In the following examples, several adhesives were prepared and compared to commercially available adhesives, to further illustrate the invention without limiting its scope.

Kraft lignin was supplied by UPM as LignoBoost™ as a powder, oxidized lignin (AOL) was made at Aarhus University as a water-ammonia solution at 18.3 wt.-% dry matter and a carboxylic acid group content of 0.80 mmol/g, number average molecular weight, Mn, of 2503 g/mol and weight average molecular weight, Mw, of 34503 g/mol. Primid XL552 was supplied by EMS-CHEMIE AG, 100% dry matter. Poly(ethylene glycol) 300 and poly(vinyl alcohol), Mw 9000-10000 g/mol, 80% hydrolyzed, were supplied by Sigma-Aldrich and were assumed anhydrous for simplicity.

SikaBond 540 and 545 obtained from Sika were used as reference examples.

Adhesive Lap Joint Shear Strength Test:

The mechanical properties of adhesives were quantified by use of single lap shear test, which is a well-known test method for comparing shear strength of adhesives and standards exist for various substrates that are being bonded. The method used was following EN205 with modifications to match the laboratory setup available. The sample preparation includes application of an adhesive to a substrate, overlapping it with another piece of designated overlap area, applying pressure on the overlap area and curing the adhesive at specified conditions. The size of the wood samples was 75×5×1.3 mm. The overlap area was 10×5 mm. Twelve samples were made for each formulation.

Water Resistance Test:

Some of the bonded specimens made for Adhesive Lap Joint Shear Strength were also subjected to water at 70° C. for three hours. Twelve samples were made for each tested formulation. After removing the samples from water, the residual strength of the samples was tested while the specimens were still wet.

Reference Example A

SikaBond 540 is a poly(vinyl acetate) based wood adhesive with approximately 46 wt.-% solids that conforms to EN 204/205 class D3 durability. Lap shear tests were made by following producer-suggested conditions (technical data sheet plus product label). Adhesive loading amount was 100 g/m$^2$ and the samples were pressed at 22±1° C. with 1.5 MPa of pressure for 30 minutes.

Reference Example B

SikaBond 545 is a wood adhesive based on methylene diphenyl diisocyanate (MDI) with approximately 100 wt.-% solids, curable with moisture and conforms to EN 204/205 class D4 durability. Lap shear tests were made by following producer-suggested conditions (technical data sheet plus product label). Loading amount was 100 g/m$^2$ and the samples were pressed at 21±1° C. with 1.5 MPa of pressure for 7 hours. Relative humidity in the laboratory was approximately 41% and wood samples were with approximately 9 wt.-% of moisture.

Oxidized Lignin Based Adhesive Examples

All the samples for testing mechanical properties were made with loading amount of 100 g/m$^2$ and the samples were pressed with 1.5 MPa of pressure for 5 minutes. Curing temperature was varied for different samples and is available in tables 1.1-1.2

Adhesive Example 1

To a mixture of 18.3% aq. AOL (100 g, thus efficiently 18.3 g AOL) stirred at room temperature was added 2.5 g Primid XL552.

Adhesive Example 2

Poly(vinyl alcohol), Mw 9000-10000 g/mol, 80% hydrolyzed was dissolved in water at 80° C. as 7 wt.-% solution and cooled down to room temperature. To a mixture of 18.3% aq. AOL (100 g, thus efficiently 18.3 g AOL) stirred at room temperature was added 40 g of poly(vinyl alcohol), Mw 9000-10000 g/mol, 80% hydrolyzed (7 wt.-% solution, thus efficiently 2.8 g of poly(vinyl alcohol)).

Adhesive Example 3

To a mixture of 18.3% aq. AOL (100 g, thus efficiently 18.3 g AOL) stirred at room temperature was added 5.0 g polyethylene glycol 300 and 2.5 g Primid XL552.

The following observations and conclusions can be made from tables 1.1 and 1.2.

It is clear that oxidized lignin without modifiers does not have binding strength. Only after addition of one or more modifiers can this adhesive bind lignocellulosic materials such as wood. Different modifiers can provide different final strength of the bonded material.

It can also be seen that by combining different modifiers, even higher mechanical properties can be obtained compared to using the same modifiers individually.

In table 1.2, influence of curing temperature on cross-linker Primid XL552 is also shown. Higher curing temperature, while keeping other conditions (like pressing time for example) unchanged, led to higher mechanical properties.

Specific formulations shown in the tables also have comparable strengths to commercially available adhesives tested in the same manner (formulation 5 versus Ref A; formulation 7 versus Ref A and Ref B). One such formulation (formulation 7) was also tested for water resistance and it again showed comparable residual strength properties to reference commercial product (Ref B, MDI based moisture curable adhesive).

This overall means that we are able to produce an adhesive composition with a high content of renewable material based on lignin, which has comparable mechanical properties to the reference systems.

TABLE 1.1

| | Ref A | Ref B | 1 | 2 | 3 | 4 | 5 |
|---|---|---|---|---|---|---|---|
| Adhesive composition | | | | | | | |
| Oxidized kraft lignin (g) | — | — | 100 | 100 | 100 | 100 | 100 |
| Primid XL552 (g) | — | — | — | 2.5 | — | — | 2.5 |
| PEG 300 (g) | — | — | — | — | 5 | — | 5 |
| poly(vinyl alcohol), Mw 9000-10000 g/mol, 80% hydrolysed (g) | — | — | — | — | — | 40 | — |
| Adhesive properties | | | | | | | |
| Shear strength (MPa) | 4.4 | 6.5 | 0 | 2.9 | 3.5 | 2.7 | 4.3 |
| Curing temperature (° C.) | 22 | 21 | 175 | 175 | 175 | 175 | 175 |

TABLE 1.2

| | Ref A | Ref B | 6 | 5 | 7 |
|---|---|---|---|---|---|
| Adhesive composition | | | | | |
| Oxidized Kraft lignin (g) | — | — | 100 | 100 | 100 |
| Primid XL552 (g) | — | — | 2.5 | 2.5 | 2.5 |
| PEG 300 (g) | — | — | 5 | 5 | 5 |
| poly(vinyl alcohol), Mw 9000-10000 g/mol, 80% hydrolysed (g) | — | — | — | — | — |
| Adhesive properties | | | | | |
| Shear strength (MPa) | 4.4 | 6.5 | 3.2 | 4.3 | 5.6 |
| Residual strength, after water resistance test (MPa) | — | 3.5 | — | — | 3.9 |
| Curing temperature (° C.) | 22 | 21 | 155 | 175 | 195 |

The following examples are directed to the preparation of an oxidized lignin, which can be used as component (i) of the aqueous adhesive composition according to present invention.

Examples

Example A

Lignin Oxidation in Ammonia Aqueous Solution by Hydrogen Peroxide

The amounts of ingredients used according to the example A are provided in table A 1.1 and A 1.2

During the development of the method according to present invention, the inventors have first started with lab-scale experiments which were performed in the scale of approximately 1 L.

Although kraft lignin is soluble in water at relatively high pH, it is known that at certain weight percentage the viscosity of the solution will strongly increase. It is typically believed that the reason for the viscosity increase lies in a combination of strong hydrogen bonding and interactions of n-electrons of numerous aromatic rings present in lignin. For kraft lignin an abrupt increase in viscosity around 21-22 wt.-% in water was observed and 19 wt.-% of kraft lignin were used in the example presented.

Ammonia aqueous solution was used as base in the pH adjusting step. The amount was fixed at 4 wt.-% based on the total reaction weight. The pH after the pH adjusting step and at the beginning of oxidation was 10.7.

Table A 2 shows the results of CHNS elemental analysis before and after oxidation of kraft lignin. Before the analysis, the samples were heat treated at 160° C. to remove adsorbed ammonia. The analysis showed that a certain amount of nitrogen became a part of the structure of the oxidized lignin during the oxidation process.

During testing in batch experiments it was determined that it is beneficial for the oxidation to add the entire amount of hydrogen peroxide during small time interval contrary to adding the peroxide in small portions over prolonged time period. In the present example 2.0 wt.-% of $H_2O_2$ based on the total reaction weight was used.

The oxidation is an exothermic reaction and increase in temperature is noted upon addition of peroxide. In this example, temperature was kept at 60° C. during three hours of reaction.

After the oxidation, the amount of lignin functional groups per gram of sample increased as determined by $^{31}$P NMR and aqueous titration. Sample preparation for $^{31}$P NMR was performed by using 2-chloro-4,4,5,5-tetramethyl-1,3,2-dioxaphospholane (TMDP) as phosphitylation reagent and cholesterol as internal standard. NMR spectra of kraft lignin before and after oxidation are shown on FIG. 4 and the results are summarized in table A 3.

Figure 5:
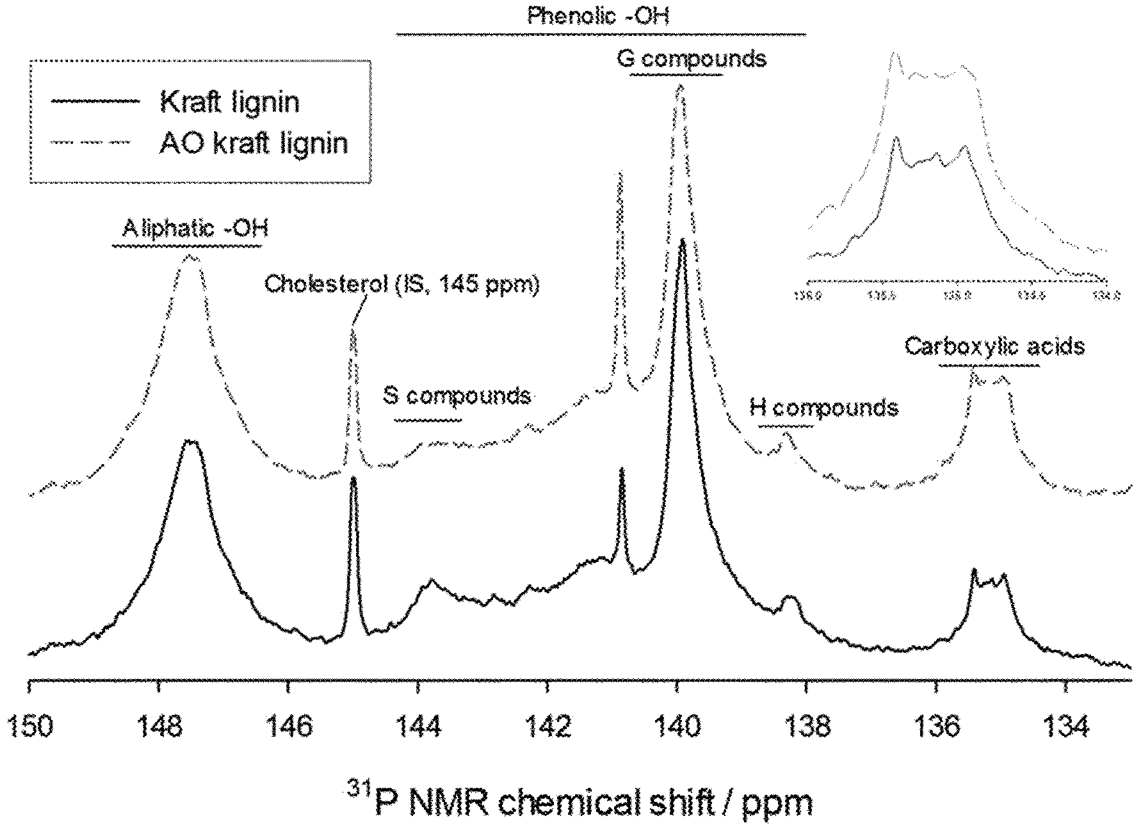
FIG. 5 shows $^{31}$P-NMR spectra of kraft lignin and ammonia oxidized kraft lignin (AOL).

FIG. 5 shows $^{31}$P NMR of kraft lignin and ammonia oxidized kraft lignin (AOL). The different hydroxyl groups, as well as the internal standard, are shown in the plot, where S, G and H refer to syringyl, guaiacyl and coumaryl (hydroxyphenyl), respectively. The insert shows the signals from carboxyl groups without off-set. The change in COOH groups was also determined by aqueous titration and utilization of the following formula:

$$C_{(COOH,mmol/g)} = \frac{(V_{2s,ml} - V_{1s,ml}) - (V_{2b,ml} - V_{1b,ml}) * C_{acid,mol/l}}{m_{s,g}}$$

Where $V_{2s}$ and $V_{1s}$ are endpoint volumes of a sample while $V_{2b}$ and $V_{1b}$ are the volume for the blank. $C_{acid}$ is 0.1M HCl in this case and $m_s$ is the weight of the sample. The values obtained from aqueous titration before and after oxidation are shown in table A 4.

The average COOH functionality can also be quantified by a saponification value which represents the number of mg of KOH required to saponify 1 g lignin. Such a method can be found in AOCS Official Method Cd 3-25.

Average molecular weight was also determined before and after oxidation with a PSS PolarSil column (9:1 (v/v) dimethyl sulphoxide/water eluent with 0.05 M LiBr) and UV detector at 280nm. Combination of COOH concentration and average molecular weight also allowed calculating average carboxylic acid group content per lignin macromolecule and these results are shown in table A 5.

Example B

Upscaling the Lignin Oxidation in Ammonia by Hydrogen Peroxide to Pilot Scale Lignin oxidation with hydrogen peroxide is an exothermic process and even in lab-scale significant temperature increases were seen upon addition of peroxide. This is a natural concern when scaling up chemical processes since the amount of heat produced is related to dimensions in the $3^{rd}$ power (volume) whereas cooling normally only increase with dimension squared (area). In addition, due to the high viscosity of the adhesive intermediates process equipment has to be carefully selected or designed. Thus, the scale up was carefully engineered and performed in several steps.

The first scale up step was done from 1 L (lab scale) to 9 L using a professional mixer in stainless steel with very efficient mechanical mixing The scale-up resulted only in a slightly higher end temperature than obtained in lab scale, which was attributed to efficient air cooling of the reactor and slow addition of hydrogen peroxide The next scale up step was done in a closed 200 L reactor with efficient water jacket and an efficient propeller stirrer. The scale was this time 180 L and hydrogen peroxide was added in two steps with appr. 30 minute separation. This up-scaling went relatively well, though quite some foaming was an issue partly due to the high degree reactor filling. To control the foaming a small amount of food grade defoamer was sprayed on to the foam. Most importantly the temperature controllable and end temperatures below 70° C. were obtained using external water-cooling.

The pilot scale reactions were performed in an 800 L reactor with a water cooling jacket and a twin blade propeller stirring. 158 kg of lignin (UPM LignoBoost™ BioPiva 100) with a dry-matter content of 67 wt.-% was de-lumped and suspended in 224 kg of water and stirred to form a homogenous suspension. With continued stirring 103 kg of 25% ammonia in water was pumped into the reactor and stirred another 2 hours to from a dark viscous solution of lignin.

To the stirred lignin solution 140 kg of 7.5wt.-% at 20-25° C. hydrogen peroxide was added over 15 minutes. Temperature and foam level was carefully monitored during and after the addition of hydrogen peroxide and cooling water was added to the cooling jacket in order to maintain an acceptable foam level and a temperature rise less than 4° C. per minute as well as a final temperature below 70° C. After the temperature increase had stopped, cooling was turned off and the product mixture was stirred for another 2 hours before transferring to transport container.

Based on the scale up runs it could be concluded that even though the reactions are exothermic a large part of the reaction heat is actually balanced out by the heat capacity of the water going from room temperature to about 60° C., and only the last part has to be removed by cooling. It should be noted that due to this and due to the short reaction time this process would be ideal for a scale up and process intensification using continuous reactors such as in-line mixers, tubular reactors or CSTR type reactors. This would ensure good temperature control and a more well-defined reaction process.

Tests of the scale up batches indicated the produced oxidized lignin had properties in accordance to the batches produced in the lab.

The amounts of materials used in their supplied form:

TABLE A 1.1

| material | wt.-% |
|---|---|
| UPM BioPiva 100, kraft lignin | 28 |
| $H_2O_2$, 30 wt.-% solution in water | 6.6 |
| $NH_3$, 25 wt.-%, aqueous solution | 16 |
| water | 49.4 |

The amounts of active material used:

TABLE A 1.2

| material | wt.-% |
|---|---|
| kraft lignin | 19 |
| $H_2O_2$ | 2 |

TABLE A 1.2-continued

| material | wt.-% |
|---|---|
| $NH_3$ | 4 |
| water | 75 |

Elemental analysis of kraft lignin before and after oxidation:

TABLE A 2

| sample | N (wt.-%) | C (wt.-%) | H (wt.-%) | S (wt.-%) |
|---|---|---|---|---|
| kraft lignin | 0.1 | 64.9 | 5.8 | 1.7 |
| ammonia oxidized kraft lignin | 1.6 | 65.5 | 5.7 | 1.6 |

Kraft lignin functional group distribution before and after oxidation obtained by $^{31}$P-NMR:

TABLE A 3

| | Concentration (mmol/g) | | |
|---|---|---|---|
| sample | Aliphatic OH | Phenolic OH | Acid OH |
| kraft lignin | 1.60 | 3.20 | 0.46 |
| ammonia oxidized kraft lignin | 2.11 | 3.60 | 0.80 |

COOH group content in mmol/g as determined by aqueous titration:

TABLE A 4

| sample | COOH (mmol/g) | groups |
|---|---|---|
| kraft lignin | 0.5 | |
| ammonia oxidized kraft lignin | 0.9 | |

Table A 5. Number (Mn) and weight (Mw) average molar masses as determined by size exclusion chromatography expressed in g/mol together with average carboxylic acid group content per lignin macromolecule before and after oxidation

TABLE A 5

| sample | Mn, g/mol | Mw, g/mol | average COOH functionality |
|---|---|---|---|
| kraft lignin | 1968 | 21105 | 0.9 |
| ammonia oxidized kraft lignin | 2503 | 34503 | 2.0 |

The invention claimed is:

1. An aqueous adhesive composition for lignocellulosic materials, wherein the composition comprises:

a component (i) in the form of one or more oxidized lignins;

a component (ii) in the form of one or more cross-linkers which include β-hydroxyalkylamide cross-linkers and/or oxazoline cross-linkers;

a component (iii) in the form of one or more plasticizers which includes polyethylene glycols having an average molecular weight of from 150 to 50,000 g/mol.

2. The composition of claim 1, wherein component (i) is in the form of one or more oxidized lignins, the lignins being selected from kraft lignins, soda lignins, lignosulphonate lignins, organosolv lignins, lignins from biorefining processes of lignocellulosic feedstocks, or any mixture thereof.

3. The composition of claim 1, wherein component (i) is in the form of one or more oxidized kraft lignins.

4. The composition of claim 1, wherein component (i) is in the form of one or more oxidized soda lignins.

5. The composition of claim 1, wherein component (i) is in the form of one or more ammonia-oxidized lignins.

6. The composition of claim 5, wherein the ammonia-oxidized lignins comprise one or more compounds selected from ammonia, amines, or any salts thereof.

7. The composition of claim 1, wherein component (i) has a carboxylic acid group content of from 0.05 to 10 mmol/g, based on a dry weight of component (i).

8. The composition of claim 1, wherein component (i) has an average carboxylic acid group content of more than 1.5 groups per macromolecule of component (i).

9. The composition of claim 1, wherein component (ii) is present in a concentration of from 1 to 40 wt.-%, based on a dry weight of component (i).

10. The composition of claim 1, wherein component (iii) comprises one or more plasticizers having a boiling point of from 100° C. to 280° C.

11. The composition of claim 1, wherein component (iii) is present in a concentration of from 0.5 to 50 wt.-%, based on a dry weight of component (i).

12. The composition of claim 1, wherein component (i) is in the form of one or more oxidized lignosulphonate lignins.

13. The composition of claim 1, wherein the composition further comprises one or more compounds selected from ammonia, amines, or any salts thereof.

14. The composition of claim 1, wherein the composition further comprises one or more reactive or non-reactive silicones.

15. The composition of claim 1, wherein component (ii) includes one or more β-hydroxyalkylamide cross-linkers.

16. The composition of claim 1, wherein component (ii) includes one or more oxazoline cross-linkers.

17. The composition of claim 1, wherein the composition consists essentially of a component (i) in the form of one or more oxidized lignins;

a component (ii) in the form of one or more cross-linkers which include β-hydroxyalkylamide cross-linkers and/or oxazoline cross-linkers;

a component (iii) in the form of one or more plasticizers which includes polyethylene glycols having an average molecular weight of from 150 to 50,000 g/mol;

optionally a component in the form of one or more compounds selected from ammonia, amines, or any salts thereof;

optionally a component in the form of urea;

optionally a component in the form of one or more reactive or non-reactive silicones;

optionally a hydrocarbon oil;

optionally one or more surface active agents;

water.

18. A method of producing a bonded lignocellulosic product, which method comprises contacting one or more lignocellulosic materials with the adhesive composition of claim 1 under the temperature of 155 to 195° C. and curing the adhesive composition.

* * * * *